United States Patent [19]

Aoki et al.

[11] Patent Number: 4,514,869
[45] Date of Patent: May 7, 1985

[54] TOP MEMBER FOR A VEHICLE SEAT

[75] Inventors: Akira Aoki; Kunihiko Ito, both of Akishima, Japan

[73] Assignee: Tachikawa Spring Co., Ltd., Japan

[21] Appl. No.: 519,418

[22] Filed: Aug. 1, 1983

[51] Int. Cl.³ .............................................. A47C 3/00
[52] U.S. Cl. .......................................... 5/472; 5/408;
297/DIG. 1; 156/245
[58] Field of Search .............................. 156/245, 290;
297/DIG. 1, DIG. 2; 264/321; 5/472, 408

[56] References Cited

U.S. PATENT DOCUMENTS 3,266,066  8/1966  Bereday ....................... 297/DIG. 1
4,080,675  3/1978  Kanowsky et al. ..................... 5/472
4,229,240  10/1980 Borgiani .............................. 156/290
4,374,885  2/1983  Ikeda et al. ......................... 264/321

Primary Examiner—Jay H. Woo
Assistant Examiner—Timothy W. Heitbrink
Attorney, Agent, or Firm—Cushman, Darby & Cushman

[57] ABSTRACT

A top member for a vehicle seat includes a top layer, wadding and a wadding cover laminated to one another. Rigid button core members having outer circumferential portions are interposed between the top layer and the wadding or between the wadding and the wadding cover. The outer layer and wadding cover are adhered to one another along lines radially extending between pairs of button core members and are annularly adhered to one another at the outer circumferential portions of the button core members.

8 Claims, 8 Drawing Figures

TOP MEMBER FOR A VEHICLE SEAT

TECHNICAL FIELD OF THE INVENTION

The present invention relates to a top member for a vehicle seat, and more particularly to an improved top member for a vehicle seat which includes decorative buttons and quiltings on its surface for enhancing the aesthetic appearance of the seat and which is fabricated by laminating a top layer, a wadding and a wadding cover.

BACKGROUND

In conventional vehicle seats, in order to improve the aesthetic appearance of the surface of the seat, a top member having quiltings and buttons on its surface is proposed, which is formed by first fabricating the quiltings through sewing by a sewing machine or through operation by a welder, and then sewing the buttons on the surface of the top member provided with such quiltings. Accordingly, productivity of such conventional vehicle seats is very low and its mass production is not possible. Also, such buttons cannot be secured firmly in position and, if they are rectangular in shape, the buttons will not be maintained in its predetermined direction, because they tend to be twisted. In addition, this type of conventional top member is found rather unsatisfactory in quality as well.

In view of the above-described disadvantages present in the conventional top member, it is an object of the present invention to provide a new and improved top member for a vehicle seat, wherein decorative buttons and quiltings are provided, improved productivity is obtained and the buttons will not be twisted so that they can be mounted in place positively.

Upon further study of the specification and appended claims, further objects, features and advantages of the present invention will become more fully apparent to those skilled in the art to which the invention pertains.

BRIEF SUMMARY OF THE INVENTION

Briefly, the above and other objects, features and advantages of the present invention can be attained in the following manner:

A button is formed by a method including the steps of providing a button core member at a given interval between a top layer and a wadding, applying heat and pressure onto the top layer, the wadding and a wadding cover surrounding the button core member to integrally adhere these three elements by melting, and thereafter fixing the adhered button core member. A decorative quilting is fabricated by welding (adhering by melting) the three elements, that is, the top layer, the wadding and the wadding cover to extend radially from the welded portions of the elements surrounding annularly around the button core member.

With the present invention, accordingly, the button and quilting can be formed simultaneously to provide an integral unit of the three elements, i.e. the top layer, the wadding and the wadding cover, so that the top member having such decorative buttons and quiltings on its surface can be produced easily and positively.

Also, the welded circumferences of the button core member enable an elongated button core member to be fixed such that it may not be twisted and thus can be held in a predetermined direction.

When a button is made by welding the top layer, the wadding and the wadding cover arranged around a button core member to form an integral unit, or when the button is pulled in, creases will not be produced in the top member by a quilting since the quilting is radially formed. Thus, as no creases will occur along the circumferential edges of the button, the aesthetic appearance of the seat surface will not be impaired.

A quilting is integrally provided at the outer circumferential portions of the button. Thus, when the button is pulled in, not only the button but also the quilting is pulled in. As a result of this, loads occurring in such a pulling-in action can be shared by the quilting as well as by the button to provide a positive pulling-in operation, so that the button core member will not be detached from the top member during such a pulling-in operation.

BRIEF DESCRIPTION OF THE DRAWINGS

The above and other objects, features and advantages of the present invention will be more fully apparent to those of ordinary skill in the art to which this invention pertains from the following detailed description when considered in connection with the accompanying drawings, in which like reference characters designate like or corresponding parts throughout the several views and wherein.

DETAILED DESCRIPTION OF THE INVENTION

Figure 1:
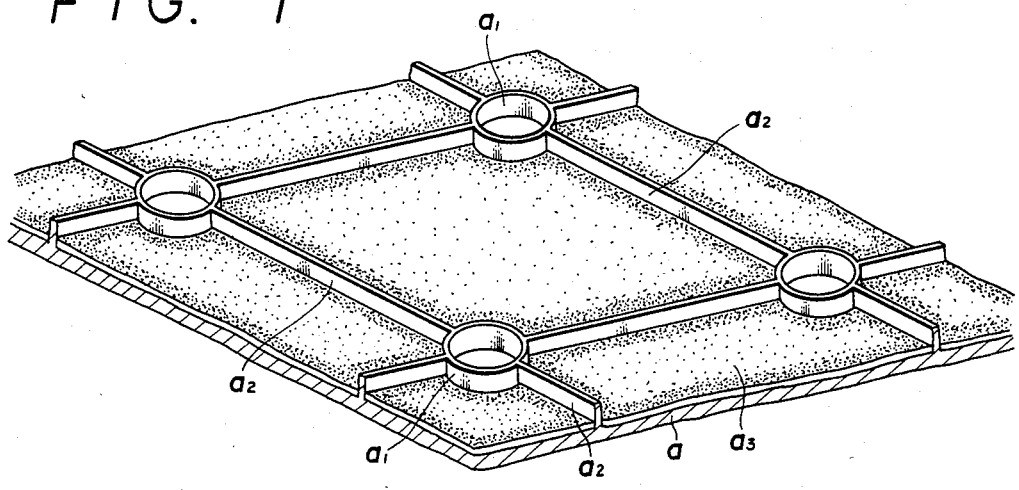
FIG. 1 is a perspective view of a lower mold for manufacturing a top member according to the present invention.

FIGS. 1 to 6 illustrate a first embodiment of a top member for a vehicle seat and more particularly a top member (A) provided at its surface with buttons (10)(10)—which are fabricated by providing a through bore (2a) in a wadding material into which the head portion (4b) of a button core member (4) fits and then inserting the button core member (4) into this through bore (2a). Top member (A) is also provided with radially extended quiltings (11) (11).

FIG. 1 shows a lower mold (a) for manufacturing the top member (A) according to the present invention. This lower mold (a) consists of an electrode plate and is provided on its surface with annually projected button forming portions (a₁) and quilting forming portions (a₂) being connected with the button forming portions (a₁) (a₁), each of these portions extending longitudinally and transversely of the lower mold respectively while the button forming portions (a₁) are spaced at a given interval from each other. Also, the quilting forming portions (a₂) are spaced at a given interval from each other radially from respective button forming portions (a₁). Reference (a₃) designates a resin plate of silicon rubber or the like having a small dielectric loss factor.

Figure 2:
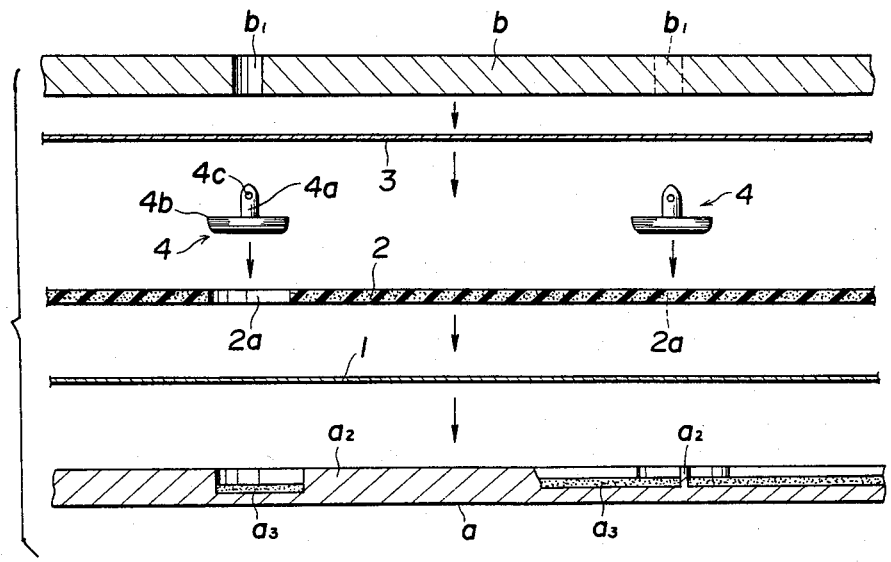
FIG. 2 is a longitudinal sectional view illustrating how to manufacture a top member of the present invention by laminating a top layer, a wadding and a wadding cover between an upper mold and the lower mold.

FIG. 2 illustrates the manner in which a top member of the present invention is manufactured by sequentially laminating a top layer (1), a wadding (3) and a wadding cover (3) between the lower mold (a) and an upper mold (b). The upper mold (b) consists of an electrode plate, as with the lower mold (a), and has a through bore (b₁) for insertion of the leg portion (4a) of the button core member (4) at a position thereof which corresponds to the center of the button forming portions (a₁) of the lower mold (a).

Onto the lower mold (a) there are piled up sequentially the top layer (1) of synthetic resin such as vinyl chloride, a thin-plate shaped wadding (2) consisting of foamed synthetic resin, and a thin-film shaped wadding cover (3) of synthetic resin. Thereafter, the head portion (4b) of the button core member (4) is fitted downwardly into the through bore (2a) of the wadding (2) located above the button forming portions (a₁) of the lower mold (a). This button core member (4) comprises the head portion (4b) and leg portion (4a). The top end of the leg portion (4a) is arranged in the form of a sharp edge, so that the leg portion (4a), when pushed by the upper mold (4b), can be passed through the wadding cover (3) to insert into the through bore (b₁) of the upper mold (b).

Figure 3:
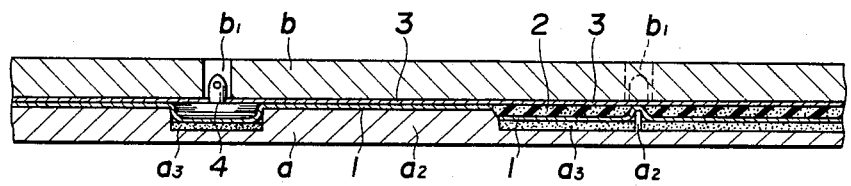
FIG. 3 is a longitudinal sectional view illustrating how to manufacture the top member of the present invention by applying heat and pressure to it between the upper and lower molds.

FIG. 3 illustrates the manner in which the top layer (1), wadding (2) and wadding cover (3) are laminated to provide the buttons (10) and the quiltings (11) and also the manner in which top layer (1), wadding (2) and wadding cover (3) are melt-adhered into an integral unit. After the core member (4) is interposed between the top layer (1) and the wadding cover (3), the lower and upper molds (a)(b) are engaged together and then heat and pressure are applied thereto, so that the top layer (1), wadding (2) and wadding cover (3) are adhered to one another to form an integral unit which constitutes the top member (A) of the present invention. Moreover, the top layer (1) is heat-adhered to the wadding cover (3) and wadding (2) annularly around the periphery of the button core member (4) so as to provide a thin compressed outline of the button core member. This heat sealing of top layer (1) to wadding cover (3) around the periphery of button core member (4) thereby enables the formed button (10) to be pulled down by means of pulling string (5). For this purpose, a self-exothermic method using a high frequency wave or an ultrasonic wave is preferred.

Figure 4:
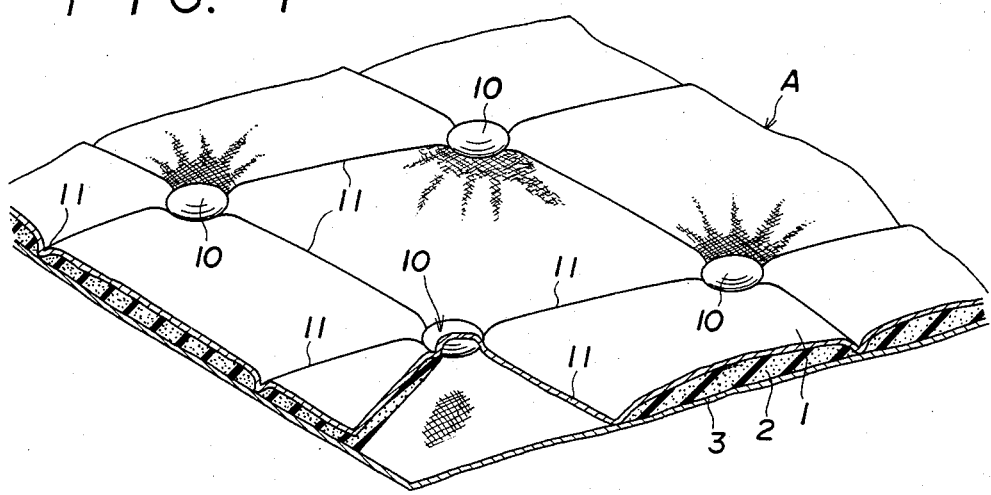
FIG. 4 is a partially cut-away perspective view of the top member according to the present invention.

FIG. 4 illustrates the top member (A) manufactured by the above-described method. That is, the top member (A) is provided on its surface with wrapped buttons (10) and quitings (11) being connected radially from the circumferential edges of the wrapped buttons, the wrapped buttons (10) being formed by covering the surface of the button core member (4) with the top layer (1). The button core member (4) is formed of a hard material such as hard synthetic resin, wood or thick paper, and is provided at its leg portion (4a) with a through bore (4c) through which a pulling string (5) is inserted.

Figure 5:
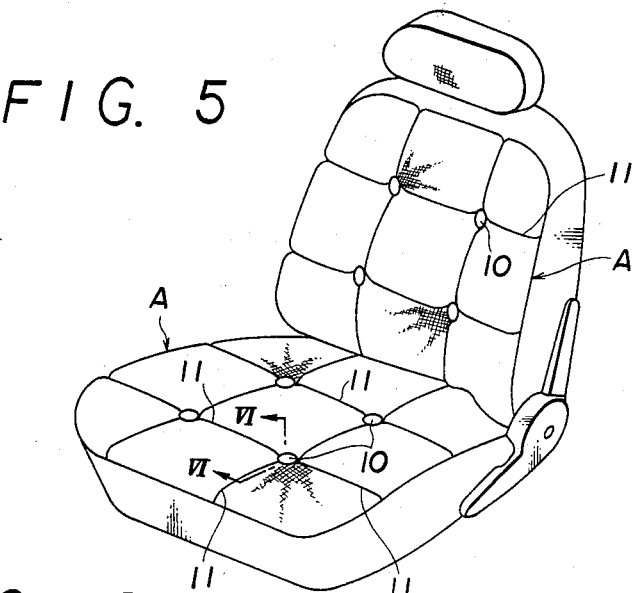
FIG. 5 is a perspective view of a vehicle seat employing the top member of the present invention.
Figure 6:
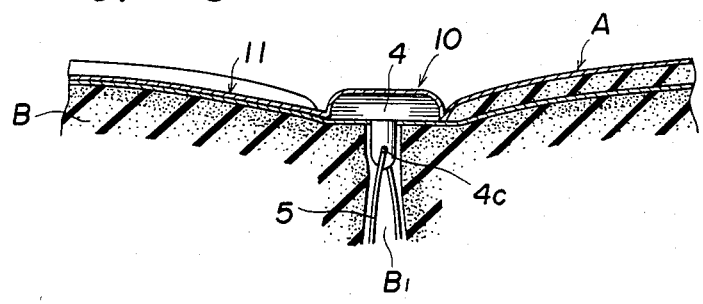
FIG. 6 is a longitudinal sectional view taken along a line VI—VI.

FIGS. 5 and 6 illustrate the manner in which the top member (A) of the present invention is used in a vehicle seat. In connection with these figures, the top member (A) is first placed over an elastic member (B) of a material such as a foam material forming the vehicle seat, then the pulling string (5) of said button core member (4) is inserted and stretched through an opening (B1) provided in the elastic member (B) and is secured to the lower part of the seat for pulling in the button core member, and at the same time the ends of the top member (A) are secured to the seat lower part with clips, whereby the vehicle seat is completed.

Figure 7:
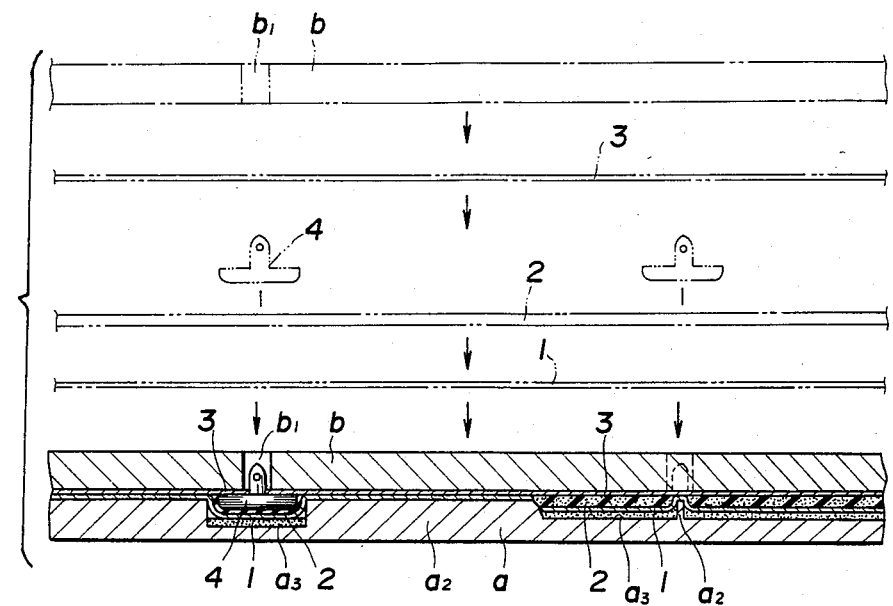
FIG. 7 is a longitudinal sectional view illustrating how to make a button by providing a button core member between a wadding and a wadding cover.
Figure 8:
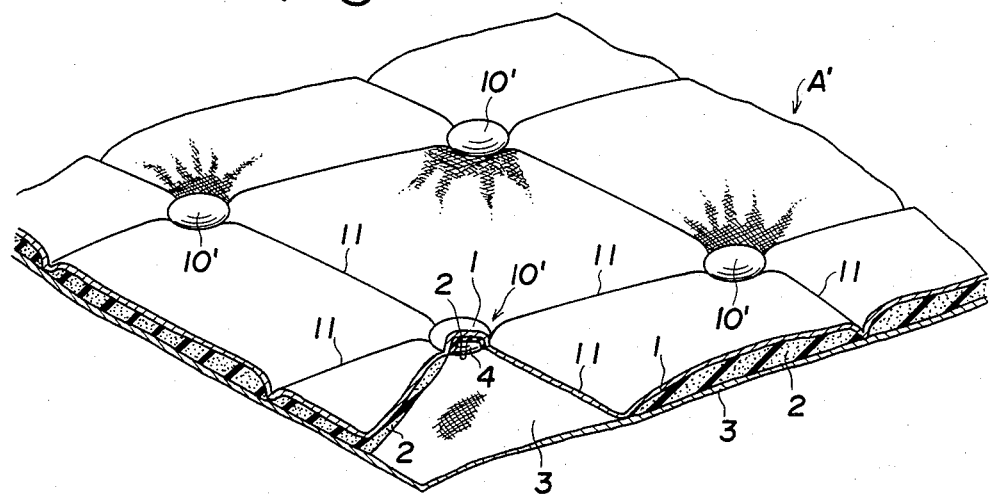
FIG. 8 is a partially cut-away perspective view of the top member formed in the manner shown in FIG. 7.

In FIGS. 7 and 8, a second embodiment of the present invention is illustrated, and, more particularly, a top member (A') and its manufacturing method are disclosed wherein buttons (10') and quiltings (11) are formed concurrently without the provision of the through bore (2a) for fitting of the button core member.

FIG. 7 illustrates the last mentioned manufacturing method wherein after the top layer (1) and wadding (2) are sequentially piled up over the lower mold (a), the head portion (4b) of the button core member (4) is placed over the wadding (a) with slight pressure such that this head portion fits into the button forming portion (a₁) in the lower mold (a), thereafter the wadding cover (3) is further laminated on the fitted head portion, and finally these laminated elements are heated and pressed in the same manner as in the first embodiment of the invention, so that the top member (A') is manufactured.

FIG. 8 illustrates the top member (A') produced by the method illustrated in FIG. 7, wherein over the top portion of the button core member (4) are placed the collapsed wadding (2) and the top layer (1). Therefore, since in the wrapped button (10') the collapsed wadding (2) is interposed between the button core member (4) and the top layer (1), the top layer (1) forming the wrapped button (10') can be attached in the appropriately stretched manner without producing any creases thanks to the elasticity of the wadding (2) provided at the internal surface of the top layer.

Although each of the above-described embodiments uses the button core member (4) which is circular in horizontal section and is provided with the leg portion (4a), it should be understood, of course, that the present invention is not always limited to the use of this type of button core member, but can select and use other types of core members as desired; for example, a button core member having no leg portion (4a) or having a head portion (4b) which is multiangular in horizontal section can also be used.

Preferably, the top layer (1), wadding (2) and wadding cover (3) described above are made of such a material as capable of high-frequency welding. If a top layer (1), a wadding (2) and a wadding cover (3) made of a non-high-frequency weldable material are used, then thermally fusible materials are interposed between said top layer (1), said wadding (2) and said wadding cover (3), respectively.

According to the present invention, the quiltings and buttons can be formed simultaneously, and thus a substantially better operationability, increased productivity and mass production can be realized, when compared with the prior art in which quiltings are first formed and thereafter buttons are put on. Also, at the same time when the quiltings and buttons are formed, according to the invention, the top layer, wadding and wadding cover can be adhered together to form an integral unit. The thus formed integral unit constituting the top member is provided with the quiltings which are connected to an annular adhesive portion forming the outer circumferential edges of the button. Therefore, since loads produced when the button is pulled in are dispersed into the quiltings from the button outer circumferences, there is no danger of the button coming off from the top member.

Further, wrinkles or creases, which may be produced when the button is formed or pulled in, can be relieved by the quiltings and therefore there is no possibility that in the button circumferential edges such creases as impair the aesthetic appearance of the seat are produced.

In addition, as the button is formed integrally with the top layer, the button can be positively mounted at the predetermined position of the top layer and, in case of a button which is multangular in horizontal section, in a predetermined direction, resulting in the production of a seat of high commercial value.

From the foregoing description, one skilled in the art can easily ascertain the essential characteristics of the present invention, and, without departing from the spirit and scope thereof, can make various changes and modifications of the invention to adapt it to various usages and conditions.

What is claimed is:

1. A top member for a vehicle seat comprising:
   a top layer, a wadding and wadding cover laminated to one another;
   a rigid button core member having outer circumferential portions interposed at a given interval between said top layer and said wadding or between said wadding and said wadding cover, and wherein
   said top layer, said wadding and said wadding cover at the outer circumferential portions of said button core member are annularly adhered to one another by application of heat and pressure to form an integral unit, and wherein
   said top layer, said wadding and said wadding cover are welded radially from the annularly adhered portions to provide an integral unit.

2. The top member as recited in claim 1 wherein said wadding defines a through bore and wherein said button core member is fitted into said through bore between said top layer and said wadding cover.

3. The top member as recited in claim 1 wherein said top layer, said wadding and said wadding cover are adhered together by means of application of heat.

4. The top member as recited in claim 1 wherein said button core member is multangular or circular in shape.

5. The top member as recited in claim 1 wherein said button core member includes a head portion and a leg portion outwardly extending from said head portion for pulling in the button core member.

6. The top member as recited in claim 1 wherein said top layer, said wadding and said wadding cover are made of a material capable of high-frequency welding.

7. The top member as recited in claim 1 wherein said button core member is pulled into the interior of said seat by a pulling string.

8. A top layer for a vehicle seat comprising:
   an outer top layer, a middle wadding layer and an inner wadding cover layer laminated to one another, said wadding layer defining plural holes therethrough;
   plural rigid button core members each disposed in a respective one of said holes so that said button core members are interposed between said outer top layer and said inner wadding cover layer, and wherein
   said outer top layer and inner wadding cover layer are (1) adhered to one another along lines radially extending between pairs of button core members and (2) annularly adhered to one another at outer circumferential portions of said button core members.

* * * * *